(No Model.)    8 Sheets—Sheet 2.

F. J. RANDALL & G. B. SNOW.
I. F. RANDALL, administratrix of F. J. RANDALL, dec'd.

CORN HARVESTER.

No. 311,526.    Patented Feb. 3, 1885.

(No Model.) 8 Sheets—Sheet 3.
F. J. RANDALL & G. B. SNOW.
I. F. RANDALL, administratrix of F. J. RANDALL, dec'd.
CORN HARVESTER.
No. 311,526. Patented Feb. 3, 1885.

Fig. 3.

Witnesses:
John B. Kaspari
John F. Steward

Inventors:
Frank J. Randall
Gilbert B. Snow (No Model.) 8 Sheets—Sheet 5.

F. J. RANDALL & G. B. SNOW.
I. F. RANDALL, administratrix of F. J. RANDALL, dec'd.
CORN HARVESTER.

No. 311,526. Patented Feb. 3, 1885.

Witnesses:
John B Kaspari
John F. Steward

Inventors:
Frank J. Randall
Gilbert B Snow (No Model.)

F. J. RANDALL & G. B. SNOW.

I. F. RANDALL, administratrix of F. J. RANDALL, dec'd.

CORN HARVESTER.

No. 311,526. Patented Feb. 3, 1885.

Witnesses:
John B. Kasper
John F. Steward

Inventors:
Frank J. Randall
Gilbert B. Snow

UNITED STATES PATENT OFFICE.

FRANK J. RANDALL, OF AURORA, AND GILBERT B. SNOW, OF SUGAR GROVE, ILLINOIS, IDA F. RANDALL ADMINISTRATRIX OF FRANK J. RANDALL, DECEASED; SAID ADMINISTRATRIX AND SAID SNOW ASSIGNORS TO WILLIAM DEERING, OF CHICAGO, ILL.

CORN-HARVESTER.

SPECIFICATION forming part of Letters Patent No. 311,526, dated February 3, 1885.

Application filed October 22, 1883. (No model.)

*To all whom it may concern:*

Be it known that we, FRANK J. RANDALL, of Aurora, in the county of Kane and State of Illinois, and GILBERT B. SNOW, of Sugar Grove, in the county and State aforesaid, have invented certain new and useful Improvements in Corn-Harvesters, of which the following is a full description, reference being had to the accompanying drawings, in which—

Fig. 10 is a perspective view of the left-hand gathering-shoe, and Fig. 11 a perspective view of the cap for the same turned partly on its side. Figs. 12 and 13 are details. Fig. 14 is a front elevation showing the gear and sprocket wheels for driving the gathering-chains. Fig. 15 is a plan view of the clutch-shifting device, with the supporting-sill in section. Fig. 16 is a cross-section of the gathering-frame on a plane at right angles to its length. Fig. 17 is a plan view of the picking-rollers. Fig. 18 is a cross-section of the same.

The object of our invention is to improve the machine shown in the patent issued to us February 22, 1881, No. 238,051; and it consists in the combination of devices, as hereinafter described, and particularly pointed out in the claims, for accomplishing the various results necessary to make a perfect harvester for gathering the ears of corn from the standing stalks.

In the drawings, A is the master-wheel, which revolves on a fixed axle secured in castings beneath the sills $A^2$ and $A^3$, one on each side of the wheel. In rear of the wheel, and bolted to these sills, is the sill $A^4$, of a length equal to the entire width of the machine, and in front of the wheel is the sill $A^5$, which extends about half the width of the machine.

$A^6$ is a sill bolted upon the left-hand ends of the sills $A^4$ and $A^5$, which, with the sill $A^3$, serves as a support for the main gearing.

$A^7$ is a sill at the extreme right-hand side of the machine, parallel with the main longitudinal sills. Upward from this sill reaches the post $A^9$, which, with the posts $A^{10}$ and $A^{11}$, forms a support for the cross-rail $A^8$. To the front end of the sill $A^2$ the butt of the tongue is rigidly bolted. To the post $A^9$ a strong stud-axle is secured, on which the wheel $A^{14}$ revolves. Reaching from the inner end of the stud-axle upward to the bar $A^8$ is the brace $a$, and rearward to the sill $A^{13}$ is the brace $a'$.

$A^{15}$ is a post bolted to the sill $A^2$, and which projects upward parallel with the post $A^{11}$. From near its top to the post $A^{11}$ reaches the cross-bar $A^{16}$, which, with the sill $A^{12}$, supports the elevator. The parts of the frame are stiffened by proper bracing, which need not be described.

Secured to the spokes of the master-wheel is the gear-wheel C, which meshes into the pinion $C'$, keyed to the shaft $C^2$, which revolves in the bearings $C^4$ and $C^5$, bolted to the frame $C^6$.

$C^7$ is a clutch splined to the shaft $C^2$.

$C^8$ is a gear-wheel loose on the shaft, and having a clutch-faced hub corresponding with the clutch $C^7$. The latter has a circumferential groove, into which fits the crotch $c$, which is rigidly secured to the slide $c'$.

A hole, $c^2$, is provided through the sill $A^3$, its ends being closed by the plates $c^3$ and $c^4$, which are provided with eyes that form bearings for the slide $c'$. A collar, $c^5$, is placed immovably on the slide, and between this and the plate $c^3$ is a spiral spring, $c^6$, by means of which the slide is moved, and hence the clutch thrown into engagement.

$c^7$ is a sliding rod lying alongside of the sill $A^3$, and held in proper place by the pressers $c^8$ and $c^9$. This rod has a bent portion, so as to bring it close against the outer side of the crotch $c$. This bent portion has an incline, $c^{10}$, of such size that when the rod is drawn in the direction indicated by the arrows the crotch $c$ will be moved so as to carry the clutch $C^7$ out of engagement.

$D^4$ is a rock-shaft supported in suitable bearings on the sills $A^2$ and $A^3$, and having the lever $D'$ and the down-reaching arm $D^2$, to which latter is connected the rod $c^7$, which is thereby moved to throw the machine out of gear.

E is a speeder-shaft supported in bearings $E'$ and $E^2$ on the frame $C^6$, and having keyed on it the pinion $E^3$ and the sprocket-wheel $E^5$.

$E^4$ is a fly-wheel keyed to the shaft, for giving momentum to the working parts.

F is a shaft parallel with and below the sill $A^4$, and having the sprocket-wheel $E^6$.

Connecting the wheels $E^3$ and $E^6$ is the chain $E^7$, having the adjustable tightener $E^8$.

The shaft F receives and distributes all of the power for operating the various parts of the machine. This shaft is supported in the bracketed bearing $F'$, bolted beneath the junction of the sills $A^3$ and $A^4$, and in the flanged bearing $F^2$, bolted to the wide part $F^3$.

Keyed to the shaft, beneath and in line with the vertical pivot of the gathering and picking frame, is the sprocket-wheel $f$, which gives motion to the gathering and picking mechanism.

$f^2$ is a bevel-pinion keyed to the shaft, and by it the elevator is driven.

G is a supporting frame or bracket having a vertical socket, (shown in section in Fig. 3,) which receives and forms a bearing for the vertical pivot $G^5$ of the gathering-frame, the said pivot being the stem of the angular crotch or yoke $G^2$. The bracket G is provided with slots for the passage of bolts, by which it is firmly secured in its place on the main frame. The slots permit vertical adjustment of the bracket when the bolts are loosened.

$G'$ is a shaft supported by the yoke $G^2$, and crossing the axis of its vertical pivot $G^5$. The shaft $G'$ also forms the horizontal pivot upon which the gathering and picking frame is adjusted vertically, as will be explained.

Figure 4:
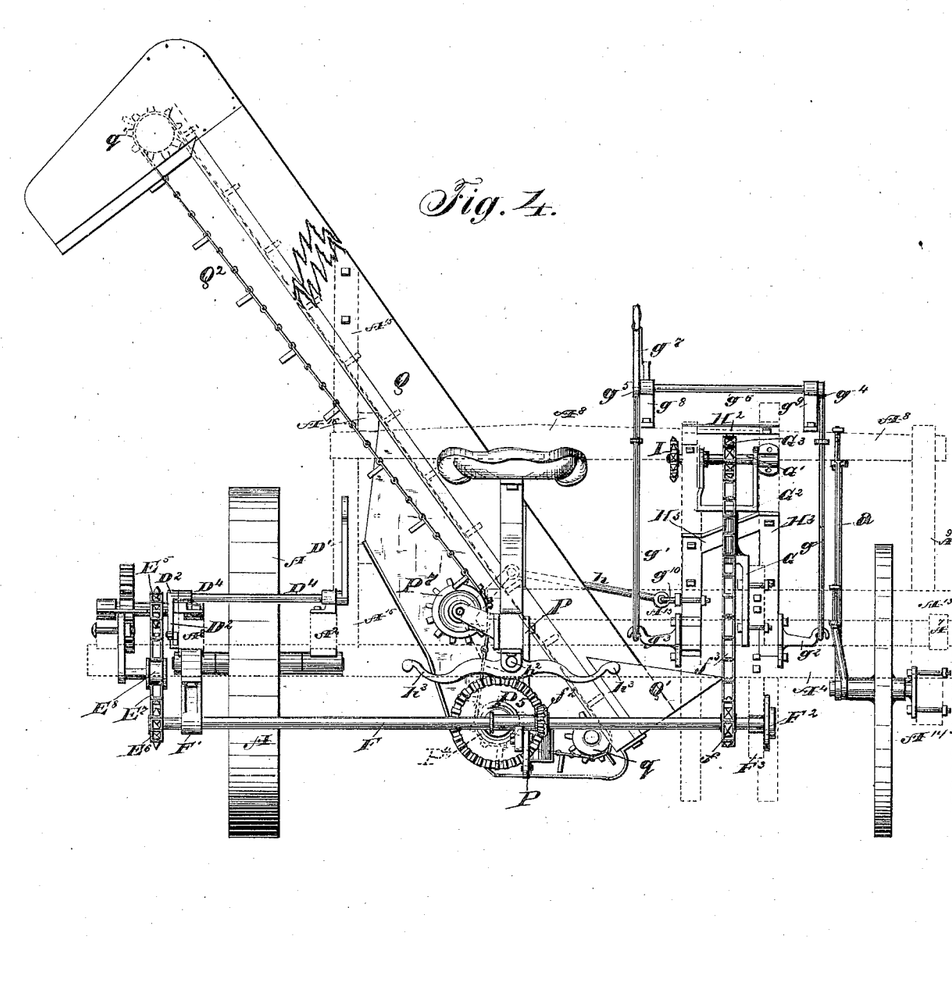
Fig. 4 is a rear elevation.

$G^3$ is a sprocket-wheel, with which and the sprocket-wheel $f$ the driving-chain $f^3$ engages, as shown in Fig. 4. After the chain $f^3$ is placed on the sprocket-wheels and made taut, the distance of the horizontal pivot the shaft $G'$ from the shaft F is constant, and hence the vertical adjustment of the gathering-frame on said pivot does not affect the length of the chain $f^3$. The vertical axis (the pivot G) being directly on a line between the sprocket-wheels $f$ and $G^3$, when the gathering-frame is swung laterally the short distance necessary to follow the row being gathered, the chain is not affected beyond a slight torsion which does not interfere with its running and driving functions.

In addition to the devices just described, which form, in effect, a universal joint, the gathering and picking frame has a further support, and one that will permit the lateral adjustment or vibration of said frame, and at the same time serve as means for the vertical adjustment. This support consists of the two adjustable rods $g$ and $g'$, connected at their lower ends to the gathering and picking frame by means of the hooks $g^2$ and $g^3$, attached to the sides of said frame. These rods at their tops connect with the arms $g^4$ and $g^5$, reaching forward from the rock-shaft $g^6$. This rock-shaft is supported in bearings in the brackets $g^8$ and $g^9$, mounted on the rail $A^8$, the bracket $g^9$ having a toothed wing, with which engages a pawl on the lever $g^7$, which is an extension of the arm $g^5$.

To the gathering-frame at $g^{10}$ we attach a rod, $h$, connected with the arm $h'$, reaching up from the rock-shaft $h^2$, supported in suitable bearings on the frame, and having the bilateral arms or pedals $h^3$ $h^3$, upon which the feet of the attendant rest, and by which the gathering-frame may be swung at will to follow a devious row of corn.

H H' are the side bars of the gathering-frame, parallel with each other, but not on the same plane, the bar H being nearly its thickness above the plane of the upper surface of the bar H. These bars are retained in their relative position by the metallic cross bar $H^2$ and by the strong metallic yoke $H^3$.

Lapping upon the lower end of the bar H, we place a bar of similar size, which has its upper surface in the same plane as that of the bar H'. This is to enable us to have that part of the left-hand side bar H of the frame, where it is beside the picking-rollers, so low that the corn may fall freely away from the latter. Said side bar H might be sawed to the shape required, and thus made in one piece. As such we shall treat it.

To the outer faces of the side bars, H H', we bolt the ends of the yoke $H^4$, for further strengthening them. It is made so high at its arch that the stalks of corn may be drawn under it and be deflected forward if very tall. The gathering-frame reaches over the space designed for the travel of the stalks as they are brought into and are carried through between the picking-rollers.

Upon the cross-shaft $G'$ we place the sprocket-wheel I, and upon the shaft $I'$, supported in a bearing in the bracket $I^2$, is the sprocket-wheel $I^3$, and connecting the two sprocket-wheels is the chain $I^4$. Upon the upper lap of the chain we place the belt-tightener $I^5$, the object in so placing it being, in part, to depress the chain as the slack will permit, so that the gathered ears shall fall over it without obstruction in escaping from the picking-rolls.

Upon the inner end of the shaft $I'$ we place the bevel gear-wheel $I^6$, which meses into the bevel gear $I^7$, mounted on a short shaft, which revolves in a bearing in the bracket $H^5$, (shown in Fig. 6,) bolted to the upper surface of the side bar H. Upon the upper end of this shaft we place the sprocket-wheel $I^8$ its whole thickness above the surface of the side bar H.

At the extreme lower end of the left-hand bar H of the frame we place the gathering-shoe $j^3$, and upon the stud $j'$, projecting upward therefrom, we mount the sprocket-wheel $j$. Around this sprocket-wheel and the sprocket-wheel $I^8$ we place the gathering-chain $j^4$, provided with teeth that project into the space in which the stalks travel. The pressure of the stalks will tend to force the chain back from its work. To prevent this the flat bar $j^5$ is placed upon the upper surface of the side bar H, between the parallel sides of the chain, and reaching nearly the whole distance between the sprocket-wheels $j$ $I^8$.

Figures 10, 11, 12, 13, 14, 15, 16, 17, 18:
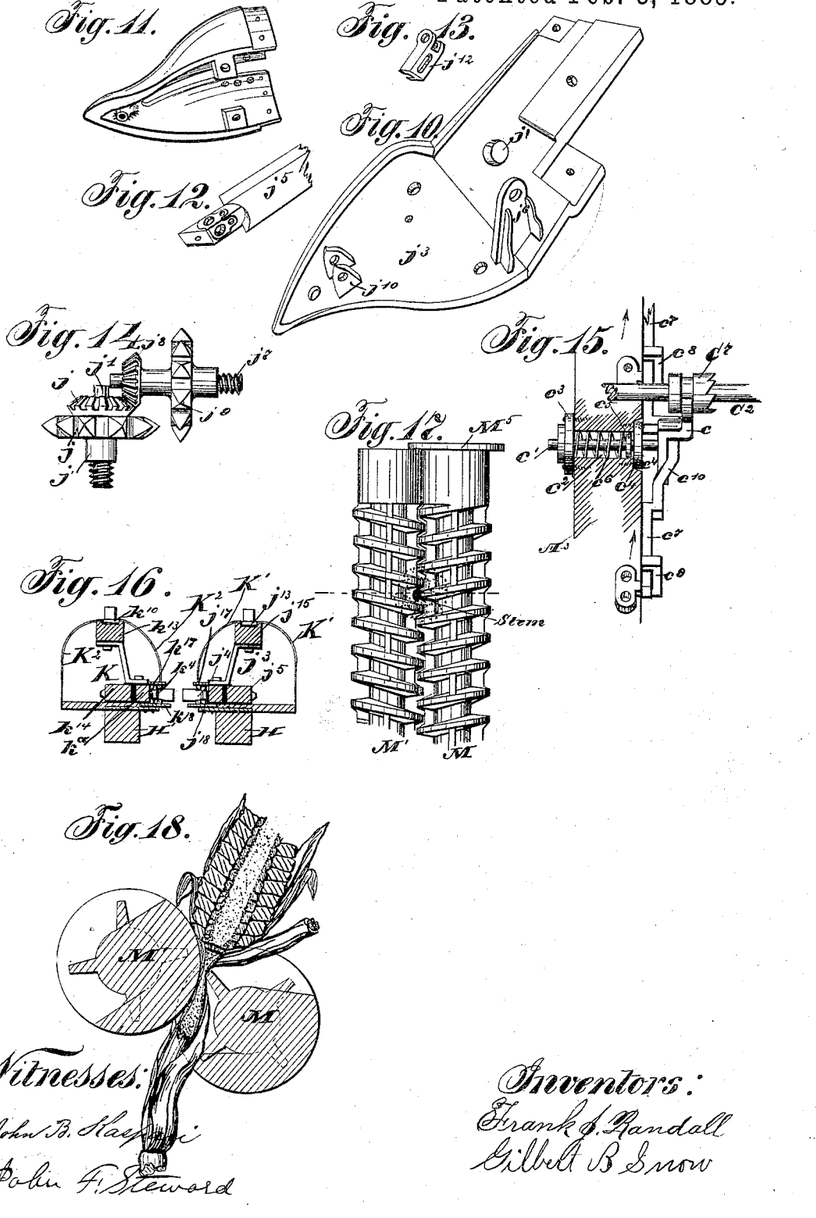

To the lug $j^6$ on the gathering-shoe $j^3$ we secure the stud-bolt $j^7$. The position of this stud in relation to the stud $j'$ is shown in Fig. 14. Their outreaching ends nearly meet.

At the lower end of the bar $j^5$ we fit a metallic piece having two holes, as shown in Fig. 12, into which the outreaching ends of the stud-bolts enter and are thus sustained.

Made in one piece with the sprocket-wheel $j$ is the bevel-gear $j^\times$, which meshes into its fellow $j^8$, which is made in one piece with the sprocket-wheel $j^9$.

$j^{10}$ are lugs reaching upward from the base of the shoe $j^3$, and between them is the roller $j^{11}$.

Figures 6, 7, 19:
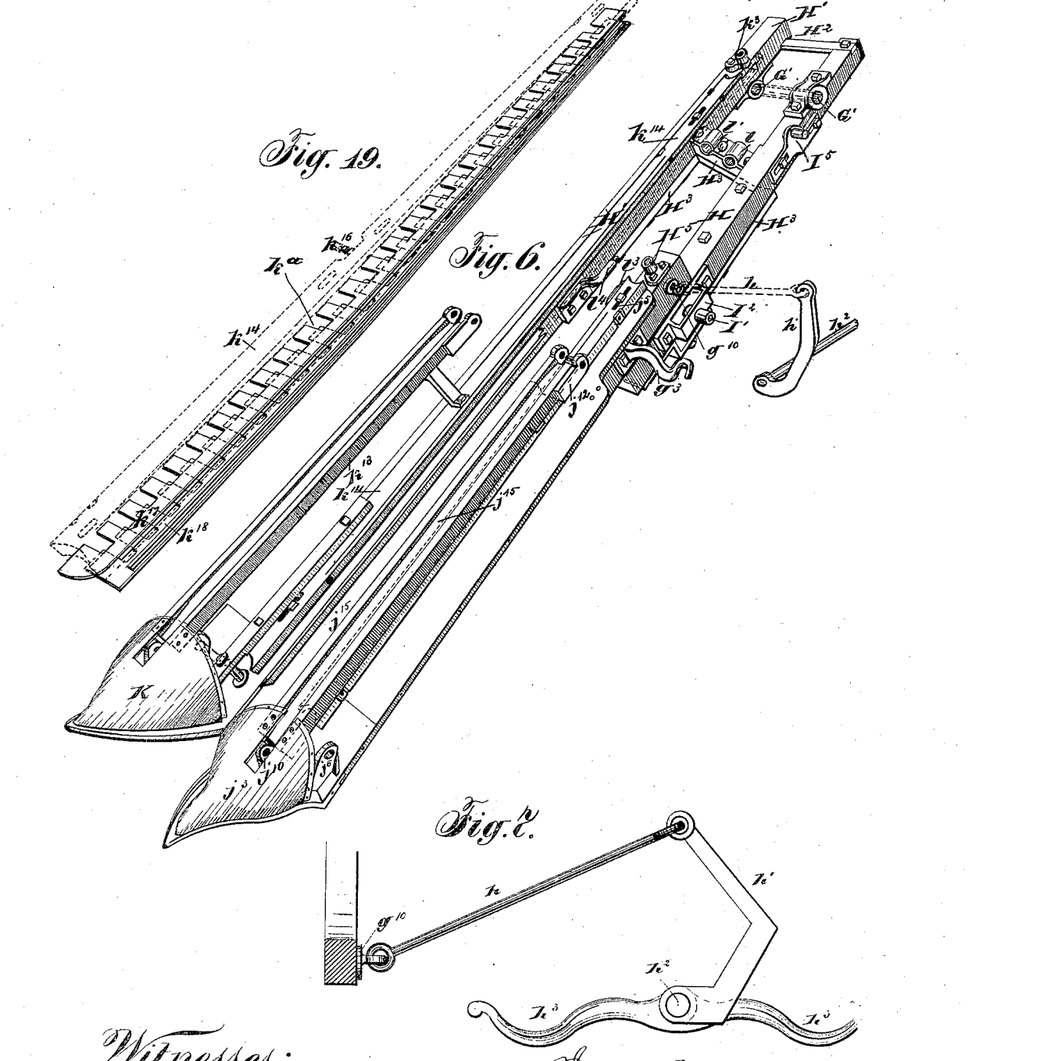
Fig. 6 is a perspective view of the gathering-frame.
Fig. 7, a front elevation of the means for adjusting it laterally.
Fig. 19 is a perspective view of one of the chain edge guides.
Figures 8, 9:
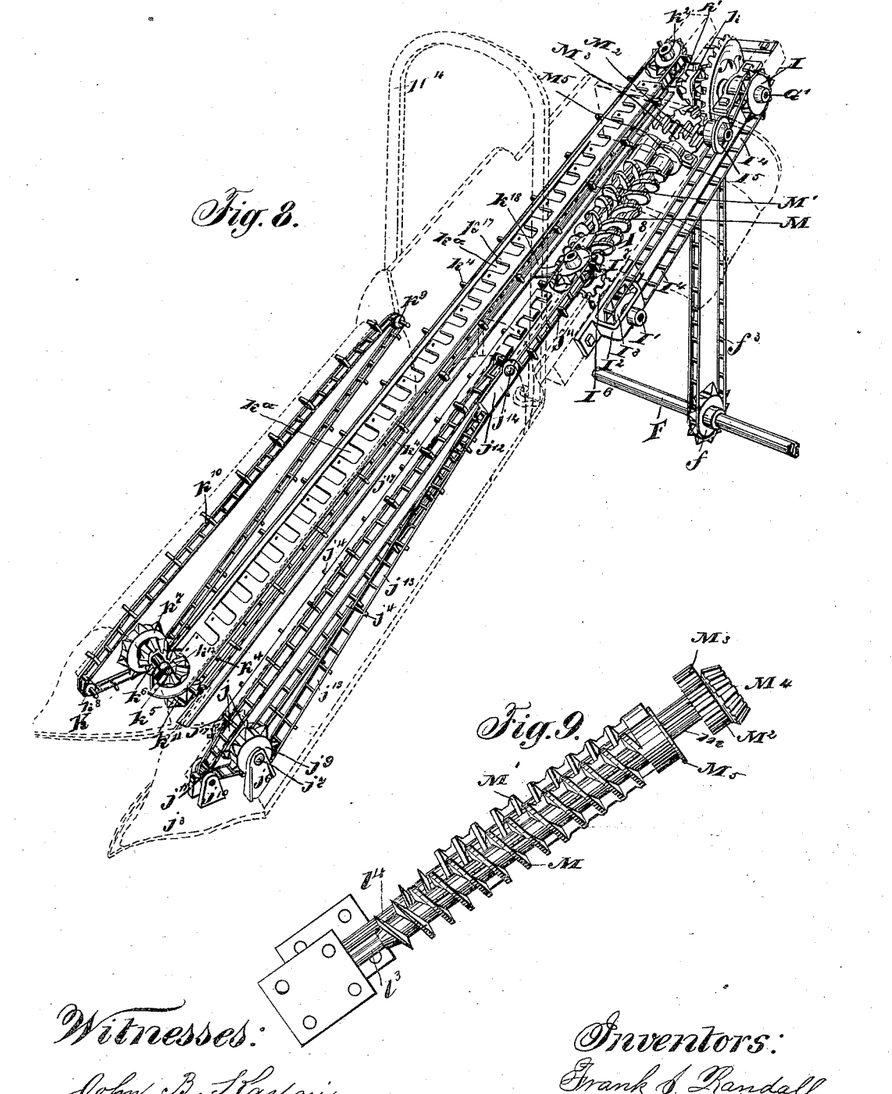
Fig. 8 is a perspective view of the gathering-chains and picking mechanism stripped of all casings.
Fig. 9 is an elevation of the left side of the picking-rollers.

$j^{14}$ is a roller in the bracket $j^{12}$, Figs. 6, 8, and 13.

Around the sprocket-wheel $j^9$ and the two last-named rollers we place the gathering-chain $j^{13}$, which, by means of the arrangement just described of the bevel-gears and sprocket-wheels, is driven by the chain $j^4$. Thus it will be seen that all of the chains upon the left-hand side of the gathering-frame are driven by the sprocket-wheel I. The roller-support $j^{12}$ is made adjustable, so that any slack in the chain $j^{13}$ may be taken up.

$j^{15}$, Fig. 6, is a grooved bar secured at its lower end to the cap of the gathering-shoe, and which reaches upward under the chain $j^{13}$, said chain lying in the groove, and supports the bracket $j^{12}$. The upper end of the bar is suitably supported by the side bar H of the frame. The chain $j^{13}$ is provided with teeth similar to those on the chain $j^4$.

The chains and gears mounted on the bars of the gathering-frame are almost wholly incased by the sheet-iron half-cylinders $K'$ and $K^2$. The teeth of the chains protrude beyond the cylindrical surfaces, as shown in Fig. 16.

The purpose of the chain $j^{13}$ is to engage stalks that may be so broken as to be crosswise of the row, and to carry them upward, while they rest on the rounded surface of the half-cylinder, which, by being large and rounded, allows them to do so without separating the parts of the stalk at the break, as would be the case when drawn over the edge of a board or over a rod, as has heretofore been done.

Upon the shaft $G'$, on the inner side of the side bar $H'$—that is, between the two bars of the gathering-frame—we place the bevel gear-wheel $k$, and mesh it into the bevel gear $k'$, keyed to a short shaft which revolves in a bearing in the bracket $k$, bolted to the bar H. (See Fig. 6.) Upon the upper end of said short shaft we place the sprocket-wheel $k^2$, from which to the sprocket-wheel $k$, near the lower end of the bar $H'$, we run the chain $k^4$. The sprocket-wheel $k^{11}$ is mounted upon a stud projecting upward from the slope of the shoe K, and has cast with it the bevel-gear $k^5$, which meshes into the bevel-gear $k^6$, having formed with it the sprocket-wheel $k^7$. Around the latter and the rollers $k^8$ and $k^9$ we place the chain $k^{10}$.

The gathering-chains, guides, and casing mounted on the side bar $H'$ are identical in purpose and are substantially identical in construction with those on the side bar H, as above described, and do not need more minute description. The chains $j^4$ and $k^4$ require guiding to prevent them from sagging, and for this purpose we provide plates $j^{17}$, $j^{18}$, $k^{17}$, and $k^{18}$, so notched as to be bent edgewise easily nearly the whole length of the bars $j^5$ and $k^{14}$, and secure them to said bars, so that they will project over the edges of the chains, as shown in Fig. 16.

Figures 5, 20:
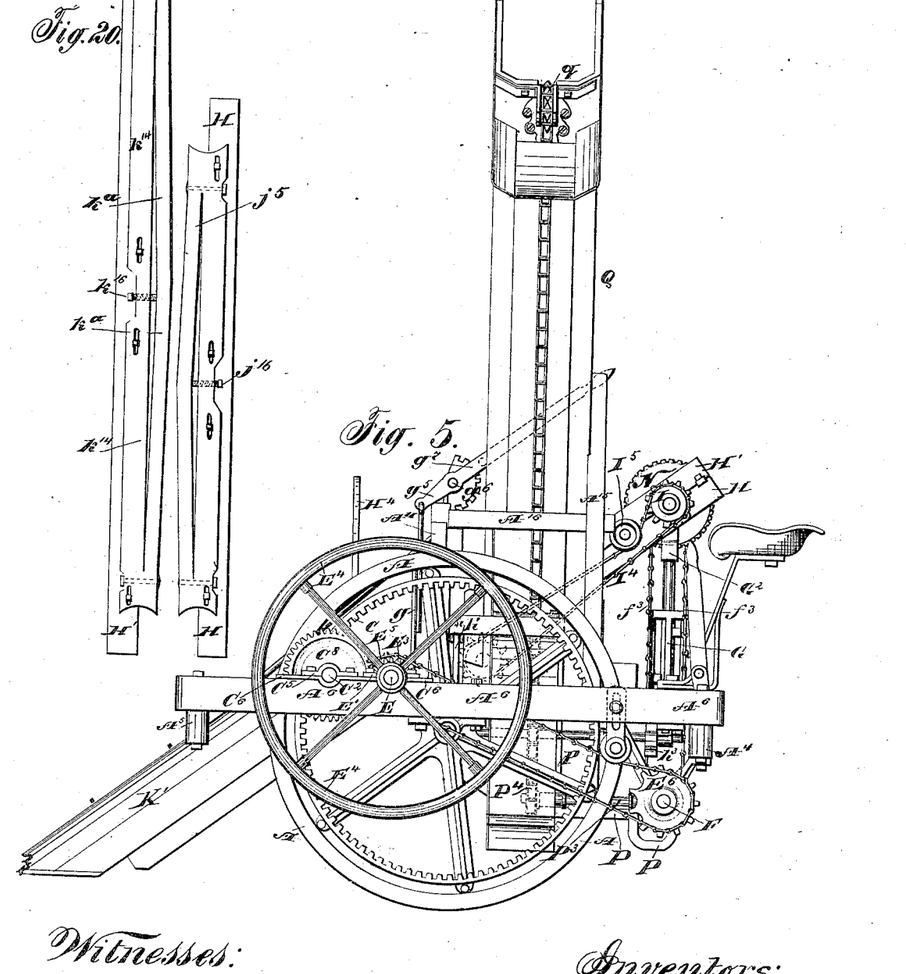
Fig. 5 is an elevation of the left side of the machine.
Fig. 20 is a plan view showing the construction of the guides which form backing for the chains.

The construction of the chain-guiding devices is shown in Figs. 19 and 20. Each bar $j^5$ $k^{14}$ is split nearly from end to end by having a saw-kerf cut entirely through it, but leaving the bar upon one side of the kerf so thin that it may be sprung outward easily. Rivets prevent the bars from splitting at their ends. Through the wider part of each bar we pass the threaded bolt $j^{16}$ or $k^{16}$, and by turning it in or out we spring the thinner part of the bar, which forms the backing for the chains, more or less, to carry the chains closer to each other, and hence to engage the stalks more closely between them. This adjustment of the chains is for the purpose of adapting them to operate on corn of rank growth of stalks, or on varieties of corn having smaller stalks.

The guide-plates $j^{17}$ $j^{18}$ and $k^{17}$ $k^{18}$, for the edges of the chains, being secured, as they are, above and below the bars $j^5$ and $k^{14}$, and to the narrow part $k^a$ of each bar, which is bent in adjusting the space between the chains, must be so made that they will bend edgewise with the thinned parts of the bars $j^5$ and $k^{14}$ as they are adjusted by the screws $j^{16}$ $k^{16}$. We therefore deeply notch them, leaving only so much of the outer edges perfect as to guide the chains.

The picking mechanism consists of two rollers, M and $M'$, supported in the frame by the following means: Upon the cross-bar of the yoke $H^3$ we place the bearings $l$ and $l'$ for the upper journals, $m$, of the rollers. Upon the inner side of the left-hand bar H of the gathering-frame we bolt a plate having the pivot $l^3$, and upon the right-hand bar H' of the frame we secure the pivot $l^4$. The lower ends of the rollers M and M' we provide with sockets which fit on the pivots. By using pivots instead of journal-bearings the least possible obstruction is offered to the entrance of the stalks between the rollers as they are brought up by the chains. Upon the two journals of the rollers we place the gear-wheels $M^2$ and $M^3$, of such diameter as to mesh together properly and cause the two rollers to revolve in unison, but in reverse directions.

At the upper end of the roller M we provide a flange, $M^5$, that overlaps the end of the roller M', so that all bits of stalks will be forced to pass through the rollers by being deflected, rather than pass out at the ends of the said rollers and be liable to wind on the journals.

Upon the shaft $m$ of the roller, above the gear-wheel $M^2$, we place the bevel-pinion $M^4$, which is in position to mesh with and be driven by the bevel gear-wheel N, keyed to the shaft G'. For nearly the entire length of the rollers we make them of screw form. The relative arrangement of the rollers and the distance between their axes are such that the threads of one will pass between those of the other, as shown in Fig. 17. The pitch of the threads, their thickness in proportion to the pitch, and their height from the body of the screws are such that a stalk of corn may lie between them without being crushed more than sufficient to produce friction enough on the rollers to compel the stalks to pass downward as the rollers are revolved. Near their upper ends the rollers are formed without screw-threads, so that for a short distance their surfaces are in contact, or nearly so. The screw-rollers decrease in size at their forward extremities, and the stalks are introduced into the space between them by the chains. When so delivered, the screws engage them and begin at once to draw them downward, as well as to advance them in their rearward course. When an ear is reached, its butt being large, it cannot be drawn downward between the rollers, the frictional contact with the stem not being sufficient, and hence the butt of the ear rides on the smooth tops of three of the threads, as shown in Figs. 17 and 18. It will be seen that the stem is between two threads of one roller, and is also near the crown of a thread on the opposite roller.

At intervals along the spiral channels of the screws we place angular webs between the threads, and nearly as high as the latter, so that when the stem of the ear is reached it shall be forcibly bitten between the said web and the opposing screw-thread and jerked from the ear. In Fig. 18 are shown the positions of the ear and the web in the act of biting the stem and jerking it from the ear. It is clear that the stem will give way at its weakest part, which fortunately is where it unites with the cob, and hence nearly all of the husks will be taken away with the stem as it passes between the rollers. The ears, when left behind by the stalks, might slide along the upper surfaces of the rollers and down to the ground should there be for an instant no incoming stalks, as at the end of the row. To prevent this we extend the chain $k^4$ well up along the rollers, so that its teeth shall engage the ears and tend to carry them upward.

Figure 1:
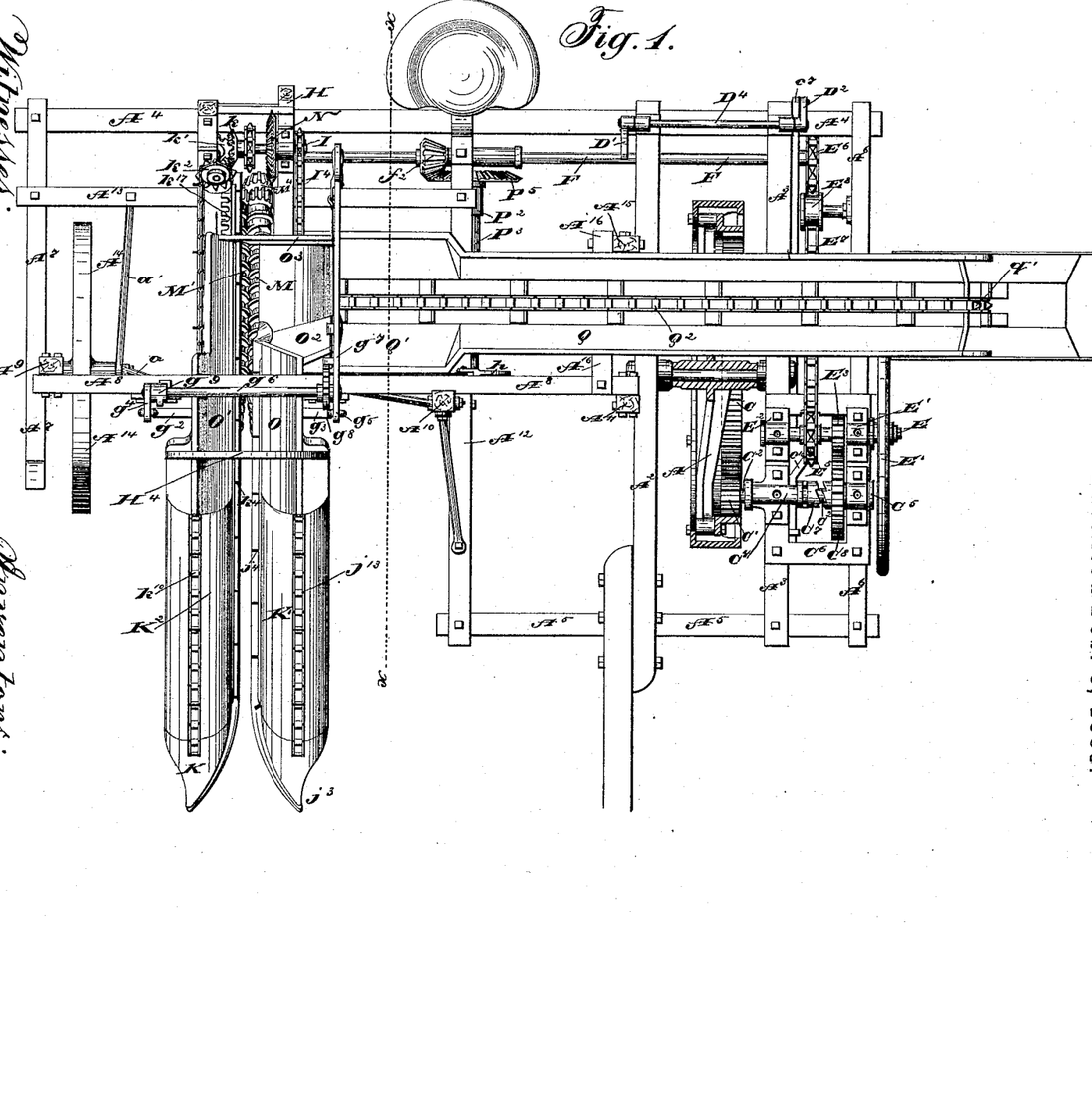
Figure 1 is a plan view of the machine, showing the master-wheel in section.
Figure 2:
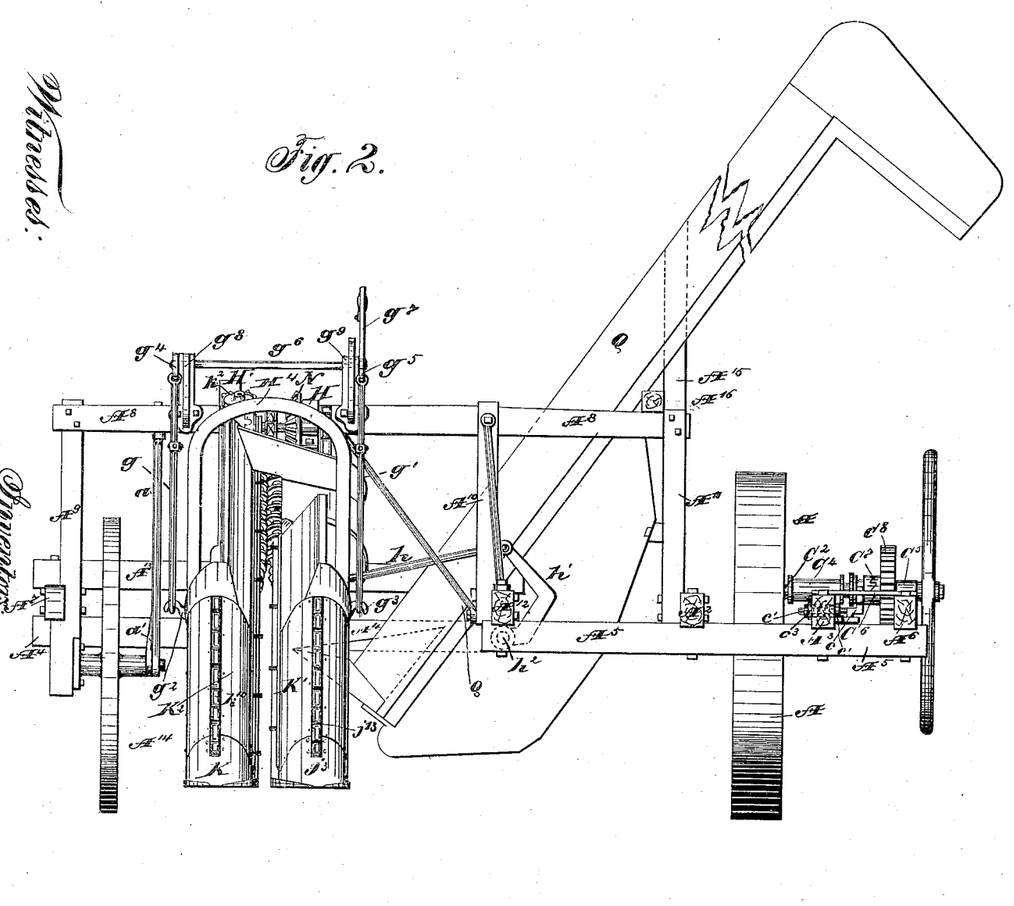
Fig. 2 is a front elevation.

To prevent the ears being thrown away by the sudden jerks given them, we place the side boards O and O' one on each side of the passage-way. We terminate the board O short of the board O', as shown in Fig. 1, so that upon the left side of the rollers the ears may fall away, and by means of the inclined boards $O^2$ and $O^3$ be guided into the hopper Q' of the elevator.

The yoke $H^4$, in addition to its office as part of the frame-work of the gatherer-frame, serves to lean the stalks forward at their tops, so that they shall be drawn through the rollers endwise, rather than be carried through sidewise.

The elevator consists of a wide trough, Q, placed at such an angle and of such length as to have its delivery end somewhat higher than the sides of an ordinary farm-wagon. At its lower end it is suitably secured to the frame-work, the only requirement being that its hopper shall be located at the delivery side of the rollers to receive ears therefrom. The cross-bar $A^{12}$ serves as the main support of this elevator.

Figure 3:
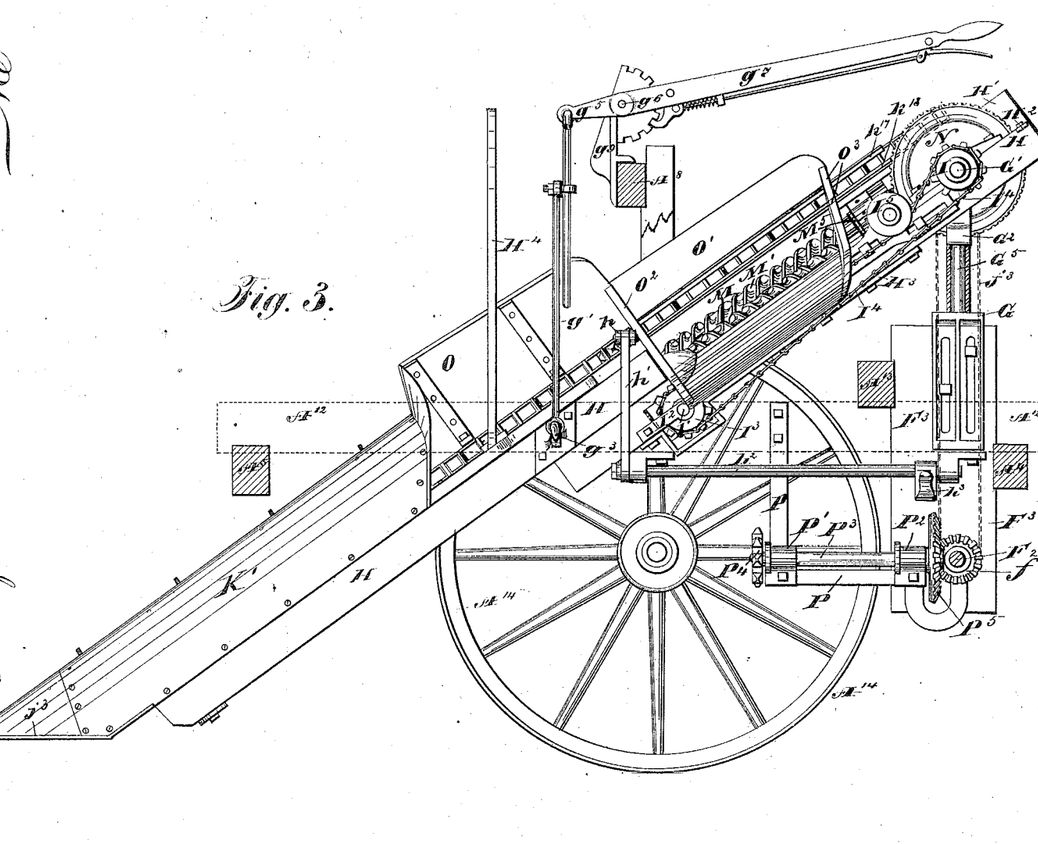
Fig. 3 is a vertical section on the line $x\ x$ of Fig. 1.

The elevating mechanism consists of an endless chain, $Q^2$, occupying the usual position at the bottom of the trough Q, and having suitable baskets. We place a frame, P, beneath the main frame, as shown in Fig. 3, and upon it mount the bearings P' and $P^2$ for the shaft $P^3$, on the forward end of which we key the sprocket-wheel $P^4$, and upon the rear end we secure the bevel gear-wheel $P^5$. Into this last we mesh the bevel-pinion $f^2$ on the shaft F. The elevating-chain $Q^2$ is thrown around the sprocket-wheels $q\ q'$ of the foot and top of the elevator-trough and around the sprocket-wheel $P^4$; but if not otherwise provided it would enwrap the latter insufficiently to be driven thereby. We therefore place the sprocket-wheel $P^7$ on the frame in such a position as to deflect the chain, as shown in Fig. 4.

We are aware that spirally-grooved rollers have been used for gathering the stalks and for picking the ears from the same, and do not claim them, broadly; but by placing them so that their threads interlock we produce a result never before attained.

We do not claim the laterally and vertically adjustable gathering and picking frame in combination with the operating-gear, for these are claimed in our application No. 52,092, filed February 8, 1882.

What we claim is—

1. The gathering-frame adapted to straddle the row of corn, and provided with the rounded upper surfaces, in combination with the gathering mechanism having its teeth reaching above or outside of the said rounded surfaces, whereby broken or prostrate stalks are carried upward while being drawn over the said rounded surfaces, substantially as described.

2. The combination of the gathering-frame having the cylindrical surfaces, the gathering-chains $j^4$, $k^4$, $j^{13}$, and $k^{10}$, suitable supporting mechanism, and the driving-gearing, substantially as described.

3. The combination of the gathering-frame having the cylindrical surfaces, the gathering-chains $j^{13}$ $k^{10}$, supported by said frame, and provided with teeth projecting above said cylindrical surfaces, the gathering-chains $j^4$ and $k^4$, moving in a plane substantially at right angles to the first-named chains, gearing for driving said chains $j^4$ and $k^4$, and intermediate operating mechanism whereby said chains $j^{13}$ $k^{10}$ are respectively driven by the chains $j^4$ $k^4$, substantially as and for the purpose set forth.

4. In a corn-harvester, picking-rollers having screw-threads and intermediate webs connecting the threads, and constructed and arranged in such a manner that the threads of one roller intermesh with the threads of the other, substantially as and for the purpose described.

5. The combination of the main frame, the gathering-frame mounted thereon on a vertical pivot, the gathering mechanism carried by said gathering-frame, the shaft G', crossing the axis of said vertical pivot, the driving-shaft F, also crossing the vertical axis, and means for transmitting motion from said driving-shaft F to said shaft G', located nearly coincident with the vertical axis, whereby said transmitting means is not materially affected by the lateral adjustment of the gathering-frame, substantially as described.

6. The combination of the main frame, the laterally-adjustable picking-frame supported on a vertical pivot, the shaft G', crossing the axis of the vertical pivot, and provided with the sprocket-wheel $G^3$, having its axis coincident with the point of intersection of the axes of said shaft and said vertical pivot, the driving-shaft F, having the sprocket-wheel $f$, located substantially at the intersection of said shaft and said vertical axis, and the driving-chain $f^3$, substantially as set forth.

7. The combination of the main frame, the shaft F, supported thereon in permanent bearings, and provided with the sprocket-wheel $f$, the yoke $G^2$, pivoted to the main frame on a vertical axis, the shaft G', supported on said yoke, and provided with the sprocket-wheel $G^3$, and means for vertically adjusting said yoke, substantially as and for the purpose described.

8. The combination, with the main frame, of the yoke $G^2$, pivoted to said frame on a vertical axis, and the gathering-frame pivoted on said yoke on a horizontal axis, substantially as and for the purpose set forth.

9. The combination, with the gathering-chains, of the guide-bars at their backs, and means for adjusting said guides, substantially as described.

10. The combination, with the gathering-chains, of the edge guides, $k^{17}$ and $k^{18}$, and the adjustable back guide, $k^{14}$, substantially as and for the purpose described.

11. The chains $j^{13}$ and $j^4$, the sprocket-wheels $j$ and $j^9$, and the gears $j^\times$ and $j^8$, all combined substantially as described.

FRANK J. RANDALL.
GILBERT B. SNOW.

Witnesses:
JOHN B. KASPARI,
JOHN F. STEWARD.